United States Patent Office.

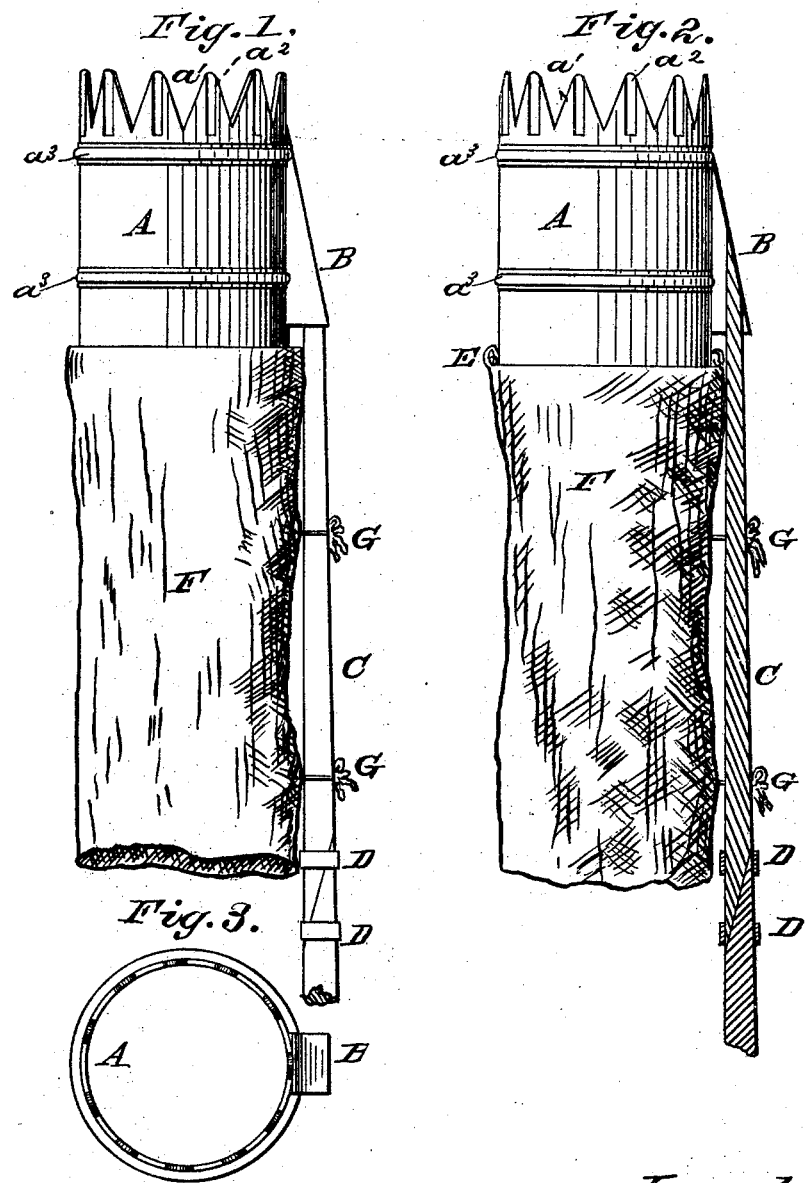

ALDEN S. STEVENS, OF ATTICA, NEW YORK.

Letters Patent No. 78,549, dated June 2, 1868.

IMPROVEMENT IN FRUIT-PICKER.

*The Schedule referred to in these Letters Patent and making part of the same.*

TO ALL WHOM IT MAY CONCERN:

Be it known that I, ALDEN S. STEVENS, of Attica, in the county of Wyoming, and State of New York, have invented a new and improved Fruit-Picker; and I do hereby declare that the following is a full, clear, and exact description thereof, reference being had to the accompanying drawing, making a part of this specification, in which—

Figure I is an elevation.

Figure II is a sectional elevation.

Figure III is a cross-section.

The nature of my invention consists in combining a hollow cylinder, open at both ends, and provided with cutting-teeth at its upper end, with a conducting-bag attached to its lower end, and a manipulating-rod or pole connected to its side, so that the fruit, when cut from its stem by the cutting-teeth, may pass through the open cylinder into the conducting-bag, and thence to the ground.

Letters of like name and kind refer to like parts in each of the figures.

A represents a hollow cylinder, open at both ends, and made of tin, zinc, or sheet iron. It is provided with serrations or teeth at its upper end, as shown at $a^1$, which will catch the stem of the apple or other fruit to be gathered, and quickly and easily cut off and let the apple or other fruit drop through the cylinder into the bag or conductor, and thence into the basket.

When tin is used, a vertical bead may be formed in each tooth, for the purpose of giving it strength, as shown at $a^2$.

One or more beads may be formed around the cylinder, for giving it strength and stiffness, as shown at $a^3$.

I have contemplated forming the teeth on a thin, flat steel ring, and placing the same on the top of a tin or sheet-iron cylinder, in order to provide teeth of the most perfect kind.

Teeth formed as described, in either metal, will answer the purpose required, and they may be kept sharp by filing with a fine file.

A tapering conical socket is attached to the outside of the cylinder, for receiving and holding the handle, as shown at B.

The handle C is made correspondingly tapering at its upper end, and fits into this socket, and is held therein securely. The handle is made in two or more pieces, and the contiguous ends of these pieces are bevelled, so that, when put together, their lapping ends form the same thickness as the full size of the handle. These contiguous ends are each provided with a flat, square socket or band, D, which is made fast to the thicker part of the taper or bevel, leaving one-half of it open, to receive the taper end of the other piece. This forms a convenient and secure connection of the two parts of the handle, and will allow of a quick and easy joining or disconnection of the two, whenever it is desirable to lengthen or shorten the handle.

A heavy bead or rim is formed around the lower end of the cylinder, as represented at E, for the purpose of holding the cloth bag or conductor F, which may be drawn over it, and fastened with a cord or string.

Loops G are formed and connected with the bag, and, passing round the handle, will keep the bag in line with the handle, and allow of an easy descent of the picked fruit through it into the basket. The hand of the operator will check and guide the descent of the fruit.

In construction, this fruit-picker is very cheap. In operation, it picks the fruit from any part of the tree without difficulty, and easily, and it is generally effective whether the fruit (apples, for instance) be large or small.

What I claim as my invention, and desire to secure by Letters Patent, is—

The combination of the hollow cylinder A, open at both ends, and provided with cutting-teeth $a^1$ at its upper edge, with the conducting-bag F, attached to its lower edge, and manipulating-rod or pole C, connected to its side, as and for the purpose set forth.

ALDEN S. STEVENS.

Witnesses:
E. B. FORBUSH,
EDWARD WILHELM.